United States Patent [19]

Moran

[11] Patent Number: 5,705,061
[45] Date of Patent: *Jan. 6, 1998

[54] SIMULATED MOVING BED ADSORPTIVE SEPARATION APPARATUS

[75] Inventor: Michael G. Moran, Crystal Lake, Ill.

[73] Assignee: UOP, Des Plaines, Ill.

[*] Notice: The term of this patent shall not extend beyond the expiration date of Pat. No. 5,470,464.

[21] Appl. No.: 755,693

[22] Filed: Nov. 25, 1996

Related U.S. Application Data

[62] Division of Ser. No. 381,380, Jan. 31, 1995, Pat. No. 5,635,072.

[51] Int. Cl.⁶ .................................................. B01D 15/08
[52] U.S. Cl. ........................................ 210/198.2; 210/659
[58] Field of Search ............................. 210/635, 656, 210/659, 662, 198.2; 127/46.1, 46.2

[56] References Cited

U.S. PATENT DOCUMENTS

| | | | |
|---|---|---|---|
| 3,268,605 | 8/1966 | Boyd, Jr. | 260/666 |
| 3,706,812 | 12/1972 | DeRosset et al. | 260/674 SA |
| 4,434,051 | 2/1984 | Golem | 210/264 |
| 4,498,991 | 2/1985 | Oroskar | 210/659 |
| 4,970,002 | 11/1990 | Hotier | 210/198.2 |
| 4,990,259 | 2/1991 | Kearney | 210/659 |
| 5,064,539 | 11/1991 | Tanimura | 210/659 |
| 5,093,004 | 3/1992 | Hotier | 210/659 |
| 5,102,553 | 4/1992 | Kearney | 210/659 |
| 5,114,590 | 5/1992 | Hotier | 210/659 |
| 5,198,120 | 3/1993 | Masuda | 210/659 |
| 5,223,143 | 6/1993 | Masuda | 210/659 |
| 5,391,299 | 2/1995 | Masuda | 210/659 |
| 5,422,007 | 6/1995 | Nicoud | 210/659 |
| 5,456,825 | 10/1995 | Negawa | 210/198.2 |
| 5,470,464 | 11/1995 | Priegnitz | 210/659 |

FOREIGN PATENT DOCUMENTS

WO 92/16274  1/1992  WIPO ................. 210/198.2

OTHER PUBLICATIONS

Armand J. deRosset et al. "Liquid Column Chromatography as a Predictive Tool for Continuous Countercurrent Adsorptive Separations." *Ind. Eng. Chem. Process Des. Dev.*, vol. 15, No. 2, 1976, pp. 261–266.

Giuseppe Storti et al. "Performance of a Six-Port Simulated Moving-Bed Pilot Plant for Vapor-Phase Adsorption Separations." *Separation Science and Technology*, 27 (14), 1992, pp. 1889–1916.

Ching et al. "Preparative resolution of praziquantel enantiomers by simulated counter-current chromatography". *Journal of Chromatography*, 634 (1993) pp. 215–219.

Negawa et al. "Optical resolution by simulated moving-bed adsorption technology." *Journal of Chromatography*, 590 (1992), pp. 113–117.

*Primary Examiner*—Ernest G. Therkorn
*Attorney, Agent, or Firm*—Thomas K. McBride; John F. Spears, Jr.

[57] ABSTRACT

Various chemicals such as pharmaceuticals and petrochemicals are chromatographically separated in small quantities using an apparatus comprising a number of serially connected adsorbent-containing chambers. The chambers are linked together with valving necessary to simulate the continuous countercurrent flow of the adsorbent and liquid phases. The apparatus employs three three-port valves per chamber to direct liquid flow. Pressure pairing of the valves and the four major process streams protects product purity.

8 Claims, 1 Drawing Sheet

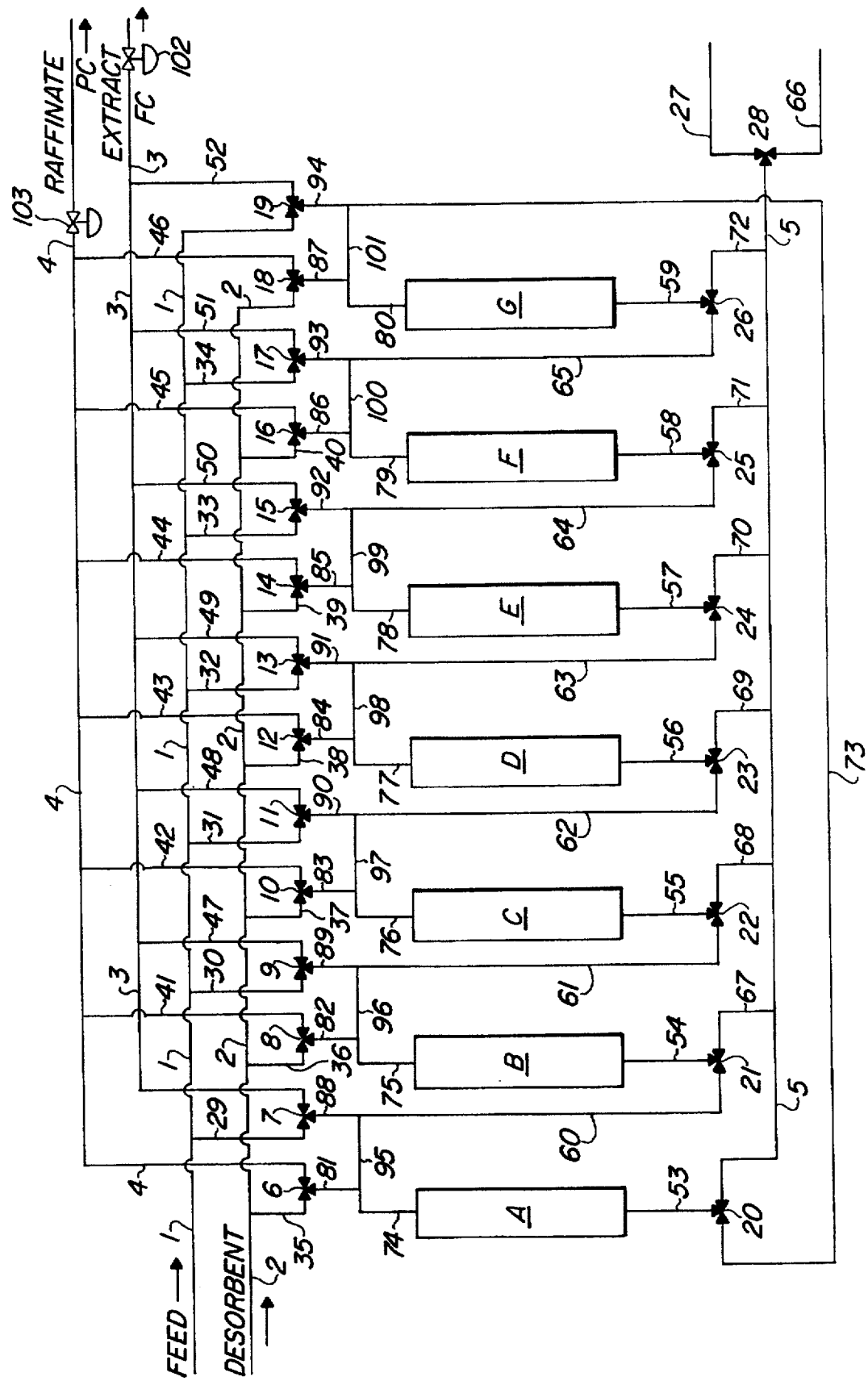

SIMULATED MOVING BED ADSORPTIVE SEPARATION APPARATUS

This application is a Division of prior application number 08/381,380 filed Jan. 31, 1995, now U.S. Pat. No. 5,635,072. The entire teaching of this prior application is incorporated herein.

FIELD OF THE INVENTION

The invention relates to chromatographic apparatus for use in the small scale separation of chemicals such as chiral pharmaceuticals. The invention more specifically relates to a novel apparatus and novel method of operation of a continuous adsorptive separation process in which the movement of the adsorbent is simulated. In a limited embodiment the invention relates to the construction and operation of small scale simulated moving bed adsorptive separation pilot plants for use in the pharmaceutical and fine chemical industries.

RELATED ART

U.S. Pat. No. 3,706,812 issued to A. J. De Rosset and R. W. Neuzil describes a pilot plant scale simulated moving bed adsorptive separation process unit. This reference also describes an operational problem of such units when they are built in the manner of larger units and include a "pump around" pump used to maintain liquid circulation in the process. The invention described in this reference is the utilization of a check valve at outlet end of each adsorbent bed to maintain unidirectional flow.

In an article appearing at page 261 of *Industrial and Engineering Chemistry, Process Design and Development*, Vol. 15, No. 2 (1976), a further description of this type of pilot plant is provided. This article also gives examples of the usage of the system and the chemical component profiles which are generated in the plant.

In an article appearing at pages 1889–1916 of *Separation Science and Technology*, Vol. 27, No. 14, (1992), there is illustrated the construction of a six- and twelve-bed simulated moving bed pilot plant using a number of multiport valves instead of a single rotary valve. One valve is used for each of the inlet and outlet streams, including a desorbent effluent stream. U.S. Pat. No. 4,434,051 issued to M. W. Golem describes an apparatus for performing a simulated moving bed adsorptive separation which employs a large number of multiport valves instead of a rotary valve as used in large scale simulated moving bed process units.

In an article published at pages 215–219 of the *Journal of Chromatography*, 634 (1993), there is shown a valve arrangement for use on a simulated moving bed adsorptive separation pilot plant.

The separation of racemic or chiral material by continuous simulated moving bed adsorptive separation was described in a presentation conducted at PREP '91 in Arlington, Va., USA on May 13–15, 1991 and printed in the *Journal of Chromatography*, 590 (1992) pages 113–117. The article gives a diagram of a small scale system with eight adsorbent chambers and four rotary valves.

U.S. Pat. No. 3,268,605 illustrates a control system which may be used on simulated moving bed process units, with the flow rate of three of the main process streams being set by flow controllers and the flow of the last stream being set by a pressure control valve. A similar control philosophy as applied to a simulated moving bed system for chiral separations is shown in patent application WO 92/16274 assigned to Bayer Aktiengesellschraft. This reference, however, employs a number of dual position valves to simulate the use of a moving bed of adsorbent.

BRIEF SUMMARY OF THE INVENTION

The invention is a valving arrangement and a method of operating a simulated moving bed adsorptive separation process which eliminate the need for a "pump around" system used to circulate fluids in the overall process. The subject invention has a number of benefits compared to the prior art when applied to pharmaceutical separations or other separations requiring a high degree of product purity. The subject invention utilizes a valving system which blocks the flow of liquid through the process immediately upstream of the bed adsorbent chamber receiving the desorbent stream. In one limited embodiment of the invention, the desorbent material contained in the next bed upstream of the point of desorbent injection is discharged from the bed at a controlled rate and at least partially recycled as desorbent.

One broad embodiment of the invention may be characterized as an apparatus for performing a continuous simulated moving bed chromatographic separation of a mixture of two or more chemical compounds which comprises a plurality of adsorbent chambers, with each chamber having a single inlet and a single outlet and having a pair of multiport valves associated with the chamber, with the inlet of each chamber being in fluid communication with a first port of a first multiport valve of the pair via a first conduit means and also being in fluid communication with a first port of a second multiport valve of the pair via a second conduit means; and with the first multiport valve of each pair being in fluid communication with a first header conduit via a second port and a third conduit and also in fluid communication with a second header conduit via a third port and a fourth conduit and the second multiport valve of each pair being in communication with a third header conduit via a second port and fifth conduit and a fourth header conduit via a third port and a sixth conduit; and with the outlet of each chamber being in fluid communication with the first port of said first multiport valve of an immediately adjacent chamber via first and second ports of a third multiport valve associated with each chamber and a seventh conduit means and also being in fluid communication with the first port of the second multiport valve of the adjacent chamber via the first and second ports of the third multiport valve and an eighth conduit means, and with a third port of the third multiport valve being in communication with a recycle conduit header via a ninth conduit means.

BRIEF DESCRIPTION OF THE DRAWING

The Drawing is a simplified diagram of a pilot plant scale apparatus built according to the subject invention and employed for the adsorptive separation of hydrocarbons through the use of simulated countercurrent liquid-adsorbent flow in the seven adsorbent chambers A–G.

DETAILED DESCRIPTION AND PREFERRED EMBODIMENTS

Simulated moving bed adsorptive separation is used commercially in a number of industries to perform useful separations of a variety of chemicals including petrochemical intermediates. It is used in the recovery of para xylene for the production of polyesters and in the recovery of normal paraffins in the production of linear olefins which are then consumed as detergent precursors. Adsorptive separation is also being investigated as a tool in many new separations of a wide variety of chemicals including chiral compounds and intermediates used in the production of experimental and therapeutic drugs. These efforts are normally conducted in small scale pilot plants which do not require much feed stock, adsorbent or plant space. This is especially true when the materials which are to be separated are expensive due to their rarity or complicated production techniques.

Pilot plant scale simulated moving bed adsorptive separation units have unique problems. They have been troubled by process stream components mixing in the empty volume of the connecting lines associated with the use of a pump referred to in the art as a "pump around" pump. One of the primary problems is that the mixing inherent in the pump and in these line volumes destroys the sharp component concentration profiles which the adsorbent creates and which is necessary to perform the desired separation. This problem is more troublesome in pilot plant scale equipment since the inventory of process liquid in the connecting lines and in the pump becomes a larger fraction of the total volume of the adsorption apparatus as the size of the plant decreases. It is an objective of this invention to provide a small scale pilot plant system which does not require a pump-around loop and pump.

This mixing problem is discussed in some detail and a solution utilizing check valves at the inlet of each adsorbent bed is presented in previously cited U.S. Pat. No. 3,706,812. This solution, however, was aimed at relatively low pressure units. When a pilot plant employs a small particle size adsorbent, that is one less than 50 microns in average diameter, then the pressure drop and operating pressure in the unit increases substantially. Whereas the pressure drop (desorbent inlet to raffinate outlet) may be in the order of 20–30 psi in a large scale pilot plant, the pressure drop in a pilot plant using high pressure liquid chromatography (HPLC) techniques may be up 1,500 psi or more. This high pressure differential makes utilization of the solution presented in the just cited reference impractical. It is therefore a specific objective of the subject invention to provide a high pressure pilot plant scale simulated moving bed adsorptive separation process which does not require check valves.

Working at the pressures involved with high pressure liquid chromatography raises other practical problems. For instance, the mechanical problems involved with preventing leaks in rotary valves increases greatly with an increased pressure. The valves tend to be of a specialty nature which increases the cost of the valves and the entire apparatus. It is a further objective to provide a small scale high pressure apparatus for simulated moving bed chromatography which employs valves having less than four ports per valve.

As previously mentioned there is presently much interest in the separation of chiral compounds for use in pharmaceuticals. The pharmaceutical industry requires very high levels of purity and therefore cannot tolerate backmixing of feed and product components in the mechanical arrangement used for simulating moving bed chromatographic separations. Specifically, transfer lines should not commingle streams by transporting both the feed and the effluent streams and valve leakage must be minimized compared to common petrochemical separations. It is a primary objective of the invention to provide an apparatus for performing simulated moving bed separations which must produce very high-purity products.

Both the stationary phase and the desorbent or mobile phase used to separate chiral compounds can be very expensive. It is a further objective of the invention to provide an adsorptive separation process which requires a reduced amount of desorbent material.

The subject invention achieves these objectives by the use of a unique flow scheme that utilizes a number of three way valves and a novel conduit arrangement to simulate the continuous countercurrent flow of the adsorbent and process streams. In the simulated moving bed technique, the normal chromatographic profiles which develop as a multicomponent feed mixture passes through a lengthy bed of adsorbent is in effect frozen in place by the periodic advancement in the location of the addition and withdrawal points of the feed, desorbent, extract and raffinate streams. A shift of the feed and withdrawal points in the direction of fluid flow simulates movement of solids in the opposite direction. Liquid flows in a downstream direction in the apparatus of the invention, which establishes a point of reference for the following description.

As used herein several terms have specific meanings. The term "rich" is intended to indicate a concentration of the indicated compound or class of compounds greater than 50 mole percent. The concentration of a desired species in the extract or raffinate streams may however not satisfy this definition. While in a unit devoted to the production of traditional petrochemicals the product stream may be quite concentrated, the product stream of a pharmaceutical separation may only contain two percent of the desired chiral compound. This product stream would have a much higher relative concentration of the desired product. The term "multiport valve" is intended to refer to a valve which has ports for connecting a single primary process stream transfer line to two or three secondary process stream transfer lines and for allowing selective flow between any one of the secondary transfer lines and the primary transfer line. A three-way ball valve is an example of a multiport valve. The term "header" is used to indicate one of the four primary transfer lines used to pass a primary process stream into the overall process or to remove a primary process stream from the overall process, and which is in communication via one set of multiport valves with the inlet of all of the adsorbent chambers used in the process. The primary process streams are the feed stream, desorbent (mobile phase) stream, raffinate stream and extract stream.

The overall process flow of the subject invention can be best described by reference to the Drawing. The Drawing is a simplified flow diagram of an embodiment of the invention employing seven adsorbent beds or chambers labeled A through G. Seven chambers are shown on the drawing basically for ease of presentation and description. The number of adsorbent chambers may vary to suit the situation. Most systems will have eight or more chambers, with twenty-four being about the maximum practical number of chambers.

The zone numbers used in this description of a simulated moving bed process are those which have become established in the art, and which are used and illustrated in U.S. Pat. Nos. 2,985,589; 3,310,486; 3,392,113 and 4,475,954 which are incorporated herein by reference for their description of the operation of these processes and equipment for its performance. The distribution of the chambers in any one zone of the apparatus depends on such factors as adsorbent performance, desorbent strength, etc.

The beds are serially interconnected by a circuit of conduits and valves in a manner described in more detail below. This interconnection forms a loop containing all of the beds, with points to add and remove liquid between each bed located at regular intervals along the loop. The location of various zones used in the separation process, such as the adsorption zone, moves around the loop.

As an overview of the process, it is assumed that at the point in time depicted in the Drawing, the feed stream of header line 1 is entering adsorbent chamber B through line 75 and will cause a displacement of the liquid in the bed, which will flow out of the bottom end of the chamber through line 54. Beds A and B form Zone I, the adsorption zone. Different fluids flow simultaneously through the zones maintained in the serially interconnected adsorbent beds. While the feed is flowing through the chambers of zone I, a stream of desorbent from header line 2 is simultaneously withdrawn from a desorbent storage tank not shown and passed through lines 40 and 79 to chamber F. This in turn displaces liquid out of the bottom of bed F which flows through line 58 to valve 25, and is directed to the top of adsorbent bed E via lines 64, 99 and 78. Beds F and E form the desorption zone, zone III. Extract liquid travels from chamber E to line 3 via lines 63, 91 and 49. Beds C and D form zone II, the purification zone and bed G is used as the buffer zone, zone IV.

While the drawing illustrates the chambers as being laid out next to one another in a row, it is preferred that the chambers are arranged in a pattern such as a circle or rectangle which results in the volume in the conduits between each of the sequential beds being substantially equal.

The separation which occurs while the feed stream passes through the adsorbent retained in chambers B and A results in the formation of a raffinate stream having a higher concentration, relative to the feed stream, of one or more component(s) originally present in the feed stream, components which are less strongly held by the adsorbent. Often, but not necessarily, the most strongly adsorbed component is the desired product. Adsorption of this component forms the raffinate stream comprising the less strongly held component(s) and admixed desorbent material which is withdrawn from the adsorption zone (bottom of adsorbent chamber A) through line 53 and delivered to valve 20. Valve 20 directs the flow of the desorbent material into line 73 through which it flows to lines 101, 87 and 46. A back-pressure valve or regulator 103 is preferably used as the device which regulates the flow rate of the raffinate stream out of the process via the raffinate header line 4. Note that the raffinate flow rate is not really set by this valve. The valve's primary function is to maintain a constant pressure at this point in the system. The flow rate is actually set by the flow rates of the three other streams.

The following is a more detailed description of the layout of the apparatus and the flows through the apparatus at one particular point in time. When the apparatus is being used to simulate a countercurrent movement of the adsorbent versus the liquid, valves will be opened or closed by a computerized control system which periodically advances the inlet points to each zone one chamber. To simulate countercurrent flow this advancement is to the left. The flow of the four basic streams of the process will therefore move through different lines and valves at different points in time. Eventually each stream flows through each adsorbent chamber in a repeated cycle. At the time being depicted in this description, a feedstream entering through line 1 flows to the right to the intersection with line 30. Because of open valves which allow fluid flow, the feedstream flows into line 30 and through valve 9. Valve 9 directs the feed stream into line 89 which transfers the feed stream into line 96 from which it flows through line 75 into adsorbent chamber B.

The structure of the apparatus comprises a number of valves and connecting lines set by the number of chambers which it is desired to employ. These lines and valves are arranged in a symmetrical pattern which may be discerned by reference to the drawing. For each chamber there is transfer line descending from the feed header line 1 with these lines being labeled 29 through 34 on the drawing. Each of these lines leads to an associated multiport valve with the valves receiving the feed stream being valves 7, 9, 11, 13, 15, 17 and 19. Each of these valves in turn has a port by which it connects with a line leading to an associated adsorbent chamber. In the drawing these lines are lines 88 through 94. Each of these lines in turn connects with one of the transfer lines labeled 95 through 101 which finally connects with the single transfer line leading to the top of each adsorbent chamber. These lines are labeled 74 through 80 on the drawing. At this point in time this sequence of lines forms the route traveled by the feed stream into the rightmost adsorbent chamber in zone I, the adsorption zone. In the next step in the advancement of the inlet ports, the feed stream would flow from header line 1 into line 29, through associated valve 7 into line 88 and finally through lines 95 and 74 into chamber A.

It is important to note that the flow of liquid through the various lines is determined by the position of the valve(s) which is open. A great majority of the valves depicted in the drawing as being located near the inlet or upper end of the chambers are in a totally closed position at any time. In contrast, the valves depicted in the drawing as being associated with the outlets of the chambers; that is, valves 20 through 26 are normally in an open position except for one valve when an optional "recycle" stream is not being recovered. This, and a variation, are described below in more detail.

That is, of the 14 valves depicted as being associated with the upper end of the adsorbent chambers, only 4 valves are positioned at any one time to allow fluid flow through the valve. These are the valves through which the feed and desorbent pass into the chambers and the extract and raffinate are removed from the chambers. All of the other valves are in a totally closed position.

The flow of the feed stream into the upper end of chamber B through line 75 displaces the liquid in the chamber, which flows downward through line 54 and is diverted into line 60 by valve 21. The liquid continues through lines 95 and 74 due to valves 6 and 7 being in a closed position. The liquid then flows into the top of chamber A. Valve 20 is positioned to direct the flow of the displaced material of line 53, which carries this nonadsorbed or raffinate material into line 73 which carries it to the intersection with line 101. Because valve 19 is totally closed and valve 18 is positioned with an appropriate open port, the raffinate material flows into line 87 through valve 18 and into valve 46 which delivers the raffinate to the raffinate header line 4.

At the same time that the feed is flowing into the apparatus through line 1, a desorbent stream flows into the apparatus through the header line 2. In a manner which mirrors the delivery of the feed stream, the desorbent header 2 is connected to the inlet of each adsorbent chamber through a series of transfer lines and one multiport valve associated with the inlet of each adsorbent chamber. For instance, for bed A the 25 desorbent would travel through line 35, valve 6 and lines 81 and 74 to enter adsorbent chamber A. However, at the time being depicted in this description of the drawing the desorbent or mobile phase is allowed to flow through line 40 by the open port of valve 16 and continues to flow through lines 86 and 79 into the inlet end of the adsorbent chamber F. Liquid displaced from the adsorbent chamber F flows through line 58 and valve 25 into line 64. Line 64, like the other lines 60 through 65, is employed to connect the outlet of each chamber to the inlet of the adsorbent chamber located immediately downstream.

The liquid stream leaving chamber F is thereby passed through lines 64, 99 and 78 into the inlet of adsorbent chamber E. Chambers F and E form Zone III, the desorption zone. The liquid displaced from the adsorbent chamber E forms the extract stream and is removed through line 57 for passage into valve 24. The position of valve 24 directs this extract stream into line 63 with the open position of valve 13 allowing the fluid to pass through line 91 into line 49 which connects to the extract header 3. The extract header 3, in a manner similar to the other header lines, is connected to the upper end of each adsorbent chamber by lines 47 through 52. The extract stream flows at some time in the process cycle through each of lines 88 through 94 and valves 7, 9, 11, 13, 15, 17 and 19.

The flow rates of the feed stream, desorbent stream and extract stream are all regulated on the basis of flow rate, which is preferably held constant. Only the raffinate stream rate is on pressure control.

The rate of withdrawal of the extract stream is set by a flow rate control valve 102. The outlet rate of the raffinate stream is set by a pressure control valve 103. The flow rate control valve 102 regulates the effluent rate of the extract stream of header line 3 to be less than the feed rate of the desorbent stream of header line 2. The rate of flow of the raffinate is therefore automatically equal to the two input streams minus the extract stream.

A portion of the extract material flowing through line 63 equal to the difference between the desorbent and extract stream flow rates is allowed to pass into line 98. This material is charged to the inlet of the purification zone (zone II) and is referred to in the art as zone II material. The function of the liquid flowing through this zone is remove raffinate material from the nonselective pore volume of the adsorbent and chambers of the purification zone. This material flows through lines 98 and 77 into the inlet of the adsorbent chamber D. The liquid displaced from the adsorbent chamber D flows through line 56 into valve 23 which directs it into line 62. The liquid then continues through lines 97 and 76 into the inlet end of the adsorbent chamber C. The liquid displaced from the adsorbent chamber C flows through line 55 and valve 22 into line 61. At this point, it joins the feed material from line 89 and flows into the adsorption zone (zone I). The raffinate material flushed from the purification zone therefore flows into the adsorption zone. The raffinate components in the material being flushed into the adsorption zone in this manner merely travel through the adsorption zone and do not interfere with the adsorption of the desired component from the feed stream.

At the other end of the sequence, a portion of the raffinate stream of line 101 may be allowed to flow into line 80 and the upper end of adsorbent chamber G in order to displace the liquid present in the adsorbent chamber G. In the time period now being described, adsorbent chamber G is the adsorbent chamber which had received the desorbent material in the previous step. At the end of that step, the chamber liquid is comprised of essentially 100% desorbent material. This optional displacement step performed by feeding raffinate material into the top of the adsorbent chamber G, also referred to herein as the "dead bed" is to allow the recovery of this desorbent material as the recycle stream. The displaced desorbent exits the bottom or outlet of adsorbent chamber G through line 59 and is directed by the multiport valve 26 into line 72. The displaced fluid is allowed to flow to the right through lines 72 and 5 into optional valve 28.

At this point in time valve 26 is positioned to allow flow into line 5 and all of the other valves associated with the outlet of the chambers; e.g., valves 20, 22, and 25 are positioned to have fluid flow to the left to the next chamber. Valve 28 may be employed in conjunction with an optional on-line analytical device not shown to recover high purity desorbent. Normally the flow of the raffinate material through the dead bed would be controlled at a set rate and for a set time which will result in an optimum recovery of high purity desorbent. However, the analytical instrument could monitor the composition of the material flowing to the right in line 5 and entering valve 28. The high purity desorbent is collected in line 27 and may be recycled to line 2. Material which is contaminated; that is, a mixture of desorbent and raffinate, is diverted into line 66 by the operation of valve 28 in response to the analytical device. Line 66 would normally connect to the raffinate header or other raffinate collection system.

This flushing of the dead bed allows the recovery of valuable desorbent material. It has no detrimental effect on the separatory performance of the process as it merely results in the adsorbent chamber G being loaded with a mixture of desorbent and raffinate components. In the next step in the process adsorbent chamber G becomes the second bed in zone I, the adsorption zone. The adsorbent still functions in the normal manner, and the contents of the chamber flows into the raffinate stream.

The drawing illustrates several advantages of the subject invention. First of all, the apparatus does not employ a pumparound stream as utilized in the original simulated countercurrent process technology. This simplifies the process, reduces the amount of line volume in the apparatus, and results in a generally improved apparatus. A subtle feature of the invention is that the arrangement of valves and lines greatly reduces or eliminates contamination problems which can result from seal failure or leakage in the valves. This benefit is achieved by means of the valving arrangement and the cascading operating pressures used in the process. For instance, the extract stream has a higher pressure than the feed stream. Therefore, if there is a leakage in valve 9, which is the active valve for directing the feed stream at the point in time depicted in the above description, the leakage will be of extract material into the transfer conduit 89. Any leakage by a valve which directs the flow of the extract stream is therefore into a conduit which contains the feed stream. In essence the leakage merely recycles the extract. Similarly, any leakage of desorbent materials through the seven valves which direct the flow of this material is into the raffinate stream. This merely dilutes the raffinate stream.

This means to produce a high-purity product is referred to herein as the proper "pressure-pairing" of the two main process streams which flow through each of the two multiport valves; e.g., 6 and 7, associated with the inlet of each chamber. By pressure pairing it is meant that the header line streams are held at different pressures and then paired together at the valves such that any leakage does not cause harmful contamination of the desired product. In the present case the four streams are maintained at different pressures with the mobile phase (desorbent) always being at the highest pressure. The extract stream has the next highest pressure. This ensures that the extract purity will always be free of contamination by a raffinate component.

While the pairing of the streams on the valves should by itself prevent some admixture possibilities, such as mobile phase and extract, the pressure cascade will have the same effect. For instance, any leakage of mobile phase into the extract would merely dilute the extract, and any leakage between the extract and the remaining two streams must be in the form of extract flowing into the feed or raffinate. While this can reduce the extract recovery rate, it will not reduce the purity of the extract product. It is also desired to have the feed pressure greater than the raffinate stream pressure. The preferred order of pressures is therefore mobile phase>extract>feed>raffinate. These same advantages are obtainable when the raffinate is the intended product.

Admittedly some of the pressure cascade sequence is set by the equipment arrangement and operation of the equipment. For instance, the pressure of the mobile phase must be greater than the extract since the mobile phase pushes the extract out of the system. Likewise the feed stream inlet pressure must be greater than the raffinate outlet pressure as the feed pushes the raffinate through the system.

The second element of the preferred pressure pairing arrangement matches one feed and one effluent stream to each of the two multiport valves which handle input and output from each adsorbent chamber. The invention therefore provides an improved valving arrangement for an apparatus for performing a simulated moving bed separation of the components of a feed stream at a pressure greater than 500 psi which may be characterized as a multichamber apparatus for performing a liquid-phase simulated moving bed separation of two components of a feed stream with the apparatus comprising at least two valves per adsorbent chamber; characterized by the improvement which comprises using at least a first and a second multiport valve per adsorbent chamber, with each of the first and the second multiport valves directing the flow of a separate process input stream and a separate process output stream, and maintaining the input and output streams of each multiport valve at a different pressure, with the input stream of the first multiport valve being higher than the pressure of the output stream and with the pressure of the output stream of the second multiport valve being higher than the pressure of the input stream of the second multiport valve, and with the input stream of the first multiport valve being rich in a mobile phase and being the highest pressure employed in the apparatus.

The subject invention leads to higher purity products in several different ways. In addition to this "pressure pairing", the physical layout of the apparatus minimizes the unflushed conduit and fitting volume which carry both the intended product and a stream containing compounds which would be a contaminant in the product. The most troubling lines which remain in the apparatus are the relatively short ones (numbers 81–94) which connect the multiport valves to the conduit system which connects the outlet of one chamber to the inlet of the next chamber. The invention allows these lines to be very short and exposed to fluid flow which will tend to help flush them.

While this description of the figures was presented on the basis of all the flows through the adsorbent beds being in a downward direction, there is no inherent requirement for this to be so. The flow through the adsorbent beds may be in an upward direction or in a combination of upward and downward directions in different beds.

As previously stated, there is preferably no direct control on the rate of flow of the raffinate stream. The flow rate of this stream is set by the rate of flow of the two streams into the process, namely, the feed and desorbent streams and the controlled rate of flow of the extract stream which leaves the process.

All but one of the valves 20–26 associated with the outlet of the chambers normally have their ports open to fluid flow at all times during the use of the apparatus. One valve is in a position which prevents flow through its ports to the next bed. The location of this one blocked port is stepped through the adsorbent beds, coordinated with the stepping of the other valves, in a manner which maintains unidirectional flow through the apparatus. This flow control through the indexing of the valves eliminates the need for the check valve in a line associated with each chamber A–G to provide unidirectional flow. This is another advantage to the subject apparatus, especially when applied to high purity separations such as pharmaceuticals.

In a variation of this, one valve is positioned differently in order to divert flow of a stream comprising recoverable desorbent out of the system. This optional stream is referred to herein as the desorbent recycle or simply the recycle stream. It is the material removed from the "dead bed" and is preferably only withdrawn at a combination of time and rate which results in high purity desorbent being removed. In this variation all of the relevant valves are open to some flow during the time the recycle stream is withdrawn.

It must be noted that the previously described "dead bed" nomenclature could be misleading when the optional desorbent recycle stream is withdrawn for reuse or analysis. The withdrawal of this stream, which has a reduced flow rate compared to the main streams, does induce some flow through the otherwise stagnant dead bed chamber. The withdrawal of this stream is optional. The desire to recover this desorbent for reuse increases with the size and length of operation of a specific apparatus. That is, as the total recoverable volume of desorbent increases the use of this line becomes more desirable. Other factors relevant to the desirability of recovering this desorbent recycle stream is the cost and difficulty of recovering desorbent from the collected raffinate and extract. The collected raffinate and extract will contain some desorbent and failure to withdraw the desorbent via line 27 increases the amount of desorbent in the raffinate.

The use of the dead bed and the recovery of mobile phase liquid from this bed has the subtle benefit of making the zone I operation more efficient. This is because the adsorption profiles which exist in the system are allowed to move further downstream, with part of the profile entering the dead bed. The effect is equivalent to using a bigger zone I.

The Drawing is only intended to explain the invention by illustrating one preferred embodiment. Many variations departing from the apparatus depicted in the drawing are possible. For instance, it will be readily recognized by those skilled in the art that the flow of the main process or header streams, that is the feed, desorbent, extract and raffinate streams, can be controlled in a number of different ways. The use of pumps to set the rate of three streams is but one example. While it is desired to control the flow rate of all five process streams, it is also desired to only employ one pressure control valve. One method of flow control which conforms to these preferences is to employ a pressure control valve on the external recycle and flow control on the major process (header) lines. An example which departs from these preferences would be the use of flow control valves on the two outlet streams or pressure control valves on the inlet streams or some combination of these valves. The depiction of the valves on the drawing should not be viewed as controlling the type of valve which may be used. For instance a multiport valve having a common feed port and four outlet ports can be used as the valve. In this instance two of the ports would always be closed. Valve selection is primarily a matter of performance, availability and price versus design specifications.

The feed and desorbent streams will normally be fed to the unit by pumps from small tanks located close to the unit. The raffinate and extract streams will normally be collected in similar tanks located close to the unit. Both the raffinate and/or extract streams may be sent to thin film evaporators, fractional distillation zones or crystallizers to recover solvent, the intended product and other compounds. The stream containing the undesired compound may be sent to a conversion zone such as an isomerization or racemization zone to produce more of the desired product and then recycled as feed.

There are a number of factors which remain constant during use of the invention such as a chosen mechanical configuration and the sequence in which the streams flow to and from the chambers. This sequence, in a downstream direction, is desorbent, extract, feed and raffinate, which sets the preferred cascade of relative pressures. The step time will normally remain constant during a run but may be varied to adjust performance. Other factors may be varied during use of the invention. The real variables are the number of beds assigned to each zone; e.g., adsorption or desorption, the step time and the flow rate of three of the process streams. The flow rates of the feed, desorbent and extract streams are preferably controlled and hence variable. The flow rate of the raffinate may vary but is really dependent on control of the other three streams.

The adsorbent particles may be in the form of any shape and of any size suitable for use in high pressure liquid chromatography. The composition of the adsorbent is not a controlling factor in the invention, which may employ any commercially available adsorbent.

The subject apparatus can be constructed from commercially available components. The adsorbent modules or chambers are preferably standard HPLC tubes but may be much larger. All of the chambers will contain the same adsorbent. The adsorbent chambers may be purchased filled with the adsorbent or the adsorbent(s) may be loaded separately. Examples of suitable adsorbent material include the cross-linked organic resins, natural or synthetic zeolites, including zeolites X, Y, L, ZSM, Beta and omega, silica-alumina, the various adsorptive aluminas, pillared and mesoporous materials including pillared clays, and nonzeolitic molecular sieves (NZMS), such as silica aluminophosphates and aluminophosphates, and chiral stationary phases. Chiral stationary phases are described in U.S. Pat. Nos. 5,254,258 and 5,290,440. Further information on the separation of chiral compounds may be obtained from U.S. Pat. No. 5,518,625 which is incorporated herein by reference.

The mobile phase or desorbent may be any compound or mixture of compounds which is a liquid at the chosen operating conditions, does not react with either the adsorbent or the compounds being separated and is tolerable or totally separable from the intended products. The desorbent may contain a chiral moiety. Depending on the compounds being separated the desorbent may comprise water, ethanol, methanol, benzene, toluene, a dialkylbenzene or a halogenated hydrocarbon.

Suitable valves and actuators are available commercially. The conduits and connectors may be of standard design for pilot scale pharmaceutical plants or HPLC instruments used for the desired separation in the relevant industry.

Despite the fact that the subject apparatus utilizes a large number of conduits, the apparatus is not significantly troubled by backmixing or intermixing of streams of different composition within the internal volume of the conduits. The basic reason for this is that all of the conduit length leading from the valves to the four header lines for the feed, desorbent, extract and raffinate streams is dedicated to carrying just one of these streams. Only the line from column to column; e.g., lines 61 or 65, and the short connectors, e.g., lines 81, 88 and 82, need to be minimized.

The valves can be mechanically linked such that they are all indexed simultaneously by a single drive mechanism. However, it is preferred that a separate electrical or airpowered actuator is provided for each valve. This allows the relative position of the feed and withdrawal points to be adjusted as desired to thereby adjust the number of adsorbent chambers in the different zones, e.g., adsorption used in the process. An electrical system which provides a means to monitor valve position is preferred.

A preferred embodiment of the subject invention can accordingly be characterized as an apparatus for performing a continuous high pressure liquid chromatographic separation which comprises a plurality of adsorbent chambers, with each chamber having an inlet and an outlet and being adapted to retain a fixed bed of a solid adsorbent, and with the adsorbent chambers being arranged and linked together in a repeating sequence by a plurality of conduits; a first set of multiport valves, with the valves in the first set being equal in number to said adsorbent chambers and with a first port of each multiport valve in the first set being connected via means comprising at least one unique conduit to the inlet of an associated adsorbent chamber; a first header line the supplying a feed stream to a second port of each multiport valve of said first set of multiport valves; a second header line removing, via means comprising a second unique conduit, an extract stream from a third port of each of multiport valve of said first set of valves; a second set of multiport valves, with the multiport valves in the second set being equal in number to said adsorbent chambers and with a first port of each multiport valve in the second set being connected via at least one unique conduit to the inlet of an associated adsorbent chamber; a third header line supplying a desorbent stream to a second port of each multiport valve of said second set of multiport valves; a fourth header line removing, via means comprising at least one unique conduit,. a raffinate stream from a third port of each of multiport valve of said second set of valves; a recycle stream header line collecting desorbent material from the outlet of said adsorbent chambers; a third set of multiport valves, with the multiport valves in the third set being equal in number to said adsorbent chambers and with; (i) a first port of each multiport valve in the third set being connected via a unique conduit to the outlet of an associated adsorbent chamber, (ii) a second port of each multiport valve in the third set being connected via a unique conduit to the inlet of the next sequential adsorbent chamber and to the inlets of a multiport valve of the first and the second sets of multiport valves and (iii) a third port of each multiport valve in the third set being connected to said recycle stream header line. By continuous process it is meant that the feed stream and a desorbent stream are simultaneously passed into the apparatus at substantially uniform rates while being initially charged to each of the chambers in turn. The term "unique conduit" is intended to refer to a conduit set aside specifically to function as the named conduit; that is, a separate conduit. The term is not intended to indicate any mechanical difference between conduits.

Operating conditions suitable for the subject process include a temperature of about $-50°$ to 300 degrees C., preferably 20° to 100 degrees C. It is generally preferred that the process is operated with a positive pressure in the general range of about 700 to 25000 kPa. Representative flow rates for a small scale unit are 0.1–2.0 ml/min for the feed and 2–20 ml/min for the desorbent. Such units would employ conduits having internal diameters of about 0.3 to about 0.6 cm and could produce 1.0 ton/year or more of dry product depending on the ease of separation. Larger units would have quite a bit larger flow rates, with the maximum feed flow rate being limited only by equipment and economic considerations. The total amount of dry product recovered from the extract in larger units could reach 1000 kg/day.

While the subject invention is envisioned as being primarily suitable for liquid phase flow, it is believed the operating principles and apparatus could be applied to vapor phase flow.

As previously mentioned chromatographic separations can be applied to a wide range of chemical compounds. Rather unusual chemicals such as chiral pharmaceutical intermediates are just one example. Fermentation broths are another. Nonchiral alkyl aromatics, halogenated aromatic compounds or aromatic compounds containing hetero atoms may also be separated using the subject invention. The aromatic compounds may have from one to four or more benzene rings. Oxygenated aromatics such as ethers, esters and alcohols, and carbohydrates such as saccharides, organic acids, proteins and amino acids are other classes of suitable feed compounds. The subject apparatus and process can be used for the separation of one specific compound from a mixture or for the separation of a class of compounds from one or more classes of different compounds.

The subject invention therefore comprises an apparatus for performing a continuous chromatographic separation which comprises: a plurality of adsorbent chambers, with each chamber having an inlet and an outlet and being adapted to retain a fixed bed of a solid adsorbent, and with the adsorbent chambers being arranged and linked together in a circuit by a repeating sequence of conduits; a first set of multiport valves, with the valves in the first set being equal in number to said adsorbent chambers and with a first port of each multiport valve in the first set being connected via means comprising at least one unique conduit to the inlet of an associated adsorbent chamber; a first header line supplying a feed stream and connected to a second port of each multiport valve of said first set of multiport valves; a second header line removing an extract stream and connected via means comprising a second unique conduit, to a third port of each of multiport valve of said first set of valves; a second set of multiport valves, with the multiport valves in the second set being equal in number to said adsorbent chambers and with a first port of each multiport valve in the second set being connected via at least one unique conduit to the inlet of an associated adsorbent chamber; a third header line supplying a desorbent stream and connected to a second port of each multiport valve of said second set of multiport valves; a fourth header line removing a raffinate stream from the apparatus and connected via means comprising at least one unique conduit to a third port of each of multiport valve of said second set of valves; a recycle stream header line collecting desorbent material from the outlet of said adsorbent chambers; a third set of multiport valves, with the multiport valves in the third set being equal in number to said adsorbent chambers and with; (i) a first port of each multiport valve in the third set being connected via a unique conduit to the outlet of an associated adsorbent chamber, (ii) a second port of each multiport valve in the third set being connected via a unique conduit to the inlet of the next sequential adsorbent chamber and to the inlets of a multiport valve of the first and the second sets of multiport valves and (iii) a third port of each multiport valve in the third set being connected to said recycle stream header line.

The subject invention can also be characterized as a simulated moving bed process for separating a multicomponent feed stream by liquid chromatography which comprises continuously repeating the following steps at each of a plurality of serially interconnected adsorbent chambers used in the process: passing the feed stream, which comprises an extract component and a raffinate component, through a first header conduit and into a first multiport valve, which is associated with the inlet of a first adsorbent chamber, and then through a first transfer conduit and into the inlet of the first adsorbent chamber, with the first adsorbent chamber being maintained at adsorption promoting conditions and containing a bed of adsorbent which is capable of selectively adsorbing the extract component; simultaneously passing an internal process stream removed from the outlet of a second adsorbent chamber, located immediately upstream of the first adsorbent chamber, through a second multiport valve, associated with the outlet of second adsorbent chamber, and into the inlet of the first adsorbent chamber while removing a first process stream from the outlet of the first adsorbent chamber and passing the first process stream through a third multiport valve, associated with the outlet of first adsorbent chamber, and into the inlet of a third adsorbent chamber, which is located immediately downstream of the first adsorbent chamber; indexing the positions of valves present in the apparatus such that the feed stream is passed into an adsorbent chamber located downstream of the first adsorbent chamber; withdrawing an extract stream comprising the extract component from the outlet of the second adsorbent chamber, passing the extract stream through the second multiport valve, associated with the outlet of the second adsorbent chamber, and then dividing the extract stream into a first portion, which is passed into the first adsorbent chamber as said internal process stream, and a second portion which is passed first into the first multiport valve, associated with the inlet of the first adsorbent chamber, and then into a second header conduit and removed from the process as an extract product stream; indexing the positions of valves in the apparatus used such that the extract stream is withdrawn from an adsorbent chamber located downstream of the first adsorbent chamber; passing a mobile phase stream comprising a desorbent compound through a third header conduit and the fourth multiport valve and into the first adsorbent chamber, with the effluent of the first adsorbent chamber being passed into the third adsorbent chamber through the third multiport valve; indexing the positions of valves used in the apparatus such that the mobile phase stream is passed into an adsorbent chamber located downstream of the first adsorbent chamber; and, withdrawing a raffinate stream from the outlet of the second adsorbent chamber and passing the extract stream through the second and fourth multiport valves and into a fourth header conduit, and withdrawing the raffinate stream from the process.

What is claimed:

1. An apparatus for performing a continuous chromatographic separation which comprises a plurality of adsorbent chambers, with each chamber having a single inlet and a single outlet and having a pair of multiport valves associated with the chamber, with the inlet of each chamber being in fluid communication with a first port of a first multiport valve of the pair via a first conduit means and also being in fluid communication with a first port of a second multiport valve of the pair via a second conduit means; and with the first multiport valve of each pair being in fluid communication with a first header conduit via a second port and a third conduit and also in fluid communication with a second header conduit via a third port and a fourth conduit and the second multiport valve of each pair being in communication with a third header conduit via a second port and fifth conduit and a fourth header conduit via a third port and a sixth conduit; and with the outlet of each chamber being in fluid communication with the first port of said first multiport valve of an adjacent chamber via first and second ports of a third multiport valve associated with each chamber and a seventh conduit means and also being in fluid communication with the first port of the second multiport valve of the adjacent chamber via the first and second ports of the third multiport valve and an eighth conduit means, and with a third port of the third multiport valve being in communication with a recycle conduit header via a ninth conduit means.

2. The apparatus of claim 1 further comprising a flow control valve present on the recycle stream header line, with the flow control valve being linked to a tenth conduit for removing a portion of the recycle stream, which portion is rich in a specific compound, from the process.

3. An apparatus for performing a continuous chromatographic separation which comprises:
   (a) a plurality of adsorbent chambers, with each chamber having an inlet and an outlet and being adapted to retain a fixed bed of a solid adsorbent, and with the adsorbent chambers being arranged and linked together in a circuit by a repeating sequence of conduits;
   (b) a first set of multiport valves, with the valves in the first set being equal in number to said adsorbent chambers and with a first port of each multiport valve in the first set being connected via means comprising at least one unique conduit to the inlet of an associated adsorbent chamber;
   (c) a first header line supplying a feed stream and connected to a second port of each multiport valve of said first set of multiport valves;
   (d) a second header line removing an extract stream and connected via means comprising a second unique conduit, to a third port of each of multiport valve of said first set of valves;
   (e) a second set of multiport valves, with the multiport valves in the second set being equal in number to said adsorbent chambers and with a first port of each multiport valve in the second set being connected via at least one unique conduit to the inlet of an associated adsorbent chamber;
   (f) a third header line supplying a desorbent stream and connected to a second port of each multiport valve of said second set of multiport valves;
   (g) a fourth header line removing a raffinate stream from the apparatus and connected via means comprising at least one unique conduit to a third port of each multiport valve of said second set of valves;
   (h) a recycle stream header line collecting desorbent material from the outlet of said adsorbent chambers; and,
   (i) a third set of multiport valves, with the multiport valves in the third set being equal in number to said adsorbent chambers and with: (i) a first port of each multiport valve in the third set being connected via a unique conduit to the outlet of an associated adsorbent chamber; (ii) a second port of each multiport valve in the third set being connected via a unique conduit to the inlet of the next sequential adsorbent chamber and to the inlets of a multiport valve of the first and the second sets of multiport valves; and, (iii) a third port of each multiport valve in the third set being connected to said recycle stream header line.

4. The apparatus of claim 3 further characterized in that the apparatus comprises at least 8 adsorbent chambers and 24 multiport valves.

5. The apparatus of claim 3 further characterized in that the apparatus comprises at least 12 adsorbent chambers and 36 multiport valves.

6. An apparatus for performing a continuous chromatographic separation which comprises:
   (a) a plurality of adsorbent chambers, with each chamber having an inlet and an outlet and being adapted to retain a fixed bed of a solid adsorbent, and with the adsorbent chambers being linked together in a repeating sequence by a plurality of conduits;
   (b) a first set of multiport valves, with the valves in the first set being equal in number to said adsorbent chambers and with a first port of each multiport valve in the first set being connected via means comprising at least one unique conduit to the inlet of an associated adsorbent chamber;
   (c) a first header line supplying a feed stream to a second port of each multiport valve of said first set of multiport valves;
   (d) a second header line removing, via means comprising a second unique conduit, an extract stream from a third port of each of multiport valve of said first set of valves;
   (e) a second set of multiport valves, with the multiport valves in the second set being equal in number to said adsorbent chambers and with a first port of each multiport valve in the second set being connected via at least one unique conduit to the inlet of an associated adsorbent chamber;
   (f) a third header line supplying a desorbent stream to a second port of each multiport .valve of said second set of multiport valves;
   (g) a fourth header line removing, via means comprising at least one unique conduit, a raffinate stream from a third port of each of multiport valve of said second set of valves;
   (h) a recycle stream header line collecting desorbent material from the outlet of said adsorbent chambers;
   (i) a third set of multiport valves, with the multiport valves in the third set being equal in number to said adsorbent chambers and with: (i) a first port of each multiport valve in the third set being connected via a unique conduit to the outlet of an associated adsorbent chamber; (ii) a second port of each multiport valve in the third set being connected via a unique conduit to the inlet of the next sequential adsorbent chamber and to the inlets of a multiport valve of the first and the second sets of multiport valves; and, (iii) a third port of each multiport valve in the third set being connected to said recycle stream header line.

7. The apparatus of claim 6 further characterized in that the apparatus comprises at least 8 adsorbent chambers and 24 multiport valves.

8. The apparatus of claim 6 further characterized in that the apparatus comprises at least 12 adsorbent chambers and 36 multiport valves.

* * * * *